(12) United States Patent
Takahashi et al.

(10) Patent No.: US 11,597,178 B2
(45) Date of Patent: Mar. 7, 2023

(54) DECORATIVE SHEET

(71) Applicant: TOPPAN PRINTING CO., LTD., Tokyo (JP)

(72) Inventors: Ryosuke Takahashi, Tokyo (JP); Mamiko Sano, Tokyo (JP); Hayato Funaki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/939,908

(22) Filed: Jul. 27, 2020

(65) Prior Publication Data

US 2020/0353713 A1    Nov. 12, 2020

Related U.S. Application Data

(63) Continuation of application No. PCT/JP2019/017429, filed on Apr. 24, 2019.

(30) Foreign Application Priority Data

Apr. 25, 2018 (JP) .............................. JP2018-084414
Oct. 10, 2018 (JP) .............................. JP2018-191838
(Continued)

(51) Int. Cl.
    *B32B 3/30*      (2006.01)
    *B32B 7/022*     (2019.01)
    (Continued)

(52) U.S. Cl.
    CPC ............... *B32B 3/30* (2013.01); *B32B 7/022* (2019.01); *B32B 27/08* (2013.01); *B32B 27/30* (2013.01);
    (Continued)

(58) Field of Classification Search
    CPC .. B32B 3/28; B32B 3/30; B32B 7/022; B32B 7/12; B32B 27/08; B32B 27/285;
    (Continued)

(56) References Cited

U.S. PATENT DOCUMENTS

2001/0019761 A1*  9/2001  Iriyama ............. B29C 45/14811
                                                          264/266
2003/0113520 A1   6/2003  Takahashi et al.
(Continued)

FOREIGN PATENT DOCUMENTS

EP     1 038 665 A1    9/2000
JP     H09-131749 A    5/1997
(Continued)

OTHER PUBLICATIONS

Machine Translation of JP 2010-083043 via EPO (Year: 2010).*
(Continued)

*Primary Examiner* — Laura C Powers
*Assistant Examiner* — Rebecca L Grusby
(74) *Attorney, Agent, or Firm* — Foley & Lardner LLP (57) ABSTRACT

A decorative sheet comprises a substrate layer; a pattern layer provided on the first front surface of the substrate layer; and a thermoplastic resin layer provided on the second front surface of the pattern layer. A test piece of 8 mm width from the decorative sheet is taken; the storage modulus is measured with an initial chuck distance of 10.77 mm, a start temperature of 30° C., an end temperature of 150° C., a temperature increase rate of 5° C./min, and a measurement frequency of 1.0 Hz. The ratio of the difference between the second storage modulus and a third storage modulus when the decorative sheet changes from the transition region to a rubbery flat region to the difference between a first storage modulus when the environmental temperature is 30° C. and (Continued)

a second storage modulus when the decorative sheet changes from a glassy region to a transition region is 3.5 or less.

13 Claims, 2 Drawing Sheets

(30) Foreign Application Priority Data

Oct. 10, 2018 (JP) .............................. JP2018-191839
Apr. 2, 2019 (JP) .............................. JP2019-070717

(51) Int. Cl.
*B32B 27/30* (2006.01)
*B32B 27/08* (2006.01)

(52) U.S. Cl.
CPC ....... *B32B 2270/00* (2013.01); *B32B 2307/31* (2013.01); *B32B 2307/4023* (2013.01); *B32B 2307/412* (2013.01); *B32B 2307/718* (2013.01); *B32B 2307/732* (2013.01); *B32B 2451/00* (2013.01)

(58) Field of Classification Search
CPC ..... B32B 27/30; B32B 27/302; B32B 27/304; B32B 27/308; B32B 27/32; B32B 27/322; B32B 27/34; B32B 27/26; B32B 27/265; B32B 2250/02; B32B 2250/04; B32B 2250/24; B32B 2250/10; B32B 2250/26; B32B 2270/00; B32B 2307/31; B32B 2307/4023; B32B 2307/4026; B32B 2307/412; B32B 2307/718; B32B 2307/732; B32B 2307/734; B32B 2307/738; B32B 2451/00; B32B 2605/003; B32B 2605/08; B32B 2605/00
See application file for complete search history.

(56) References Cited

U.S. PATENT DOCUMENTS

| 2005/0003170 | A1  |     | 1/2005  | Takeuchi et al. |              |
|--------------|-----|-----|---------|-----------------|--------------|
| 2007/0237929 | A1  | *   | 10/2007 | Suga ................. | B29C 45/14688 |
|              |     |     |         |                 | 428/195.1    |
| 2008/0070013 | A1  |     | 3/2008  | Suga et al.     |              |
| 2014/0065384 | A1  | *   | 3/2014  | Saitou ............... | B29C 45/14811 |
|              |     |     |         |                 | 428/201      |
| 2014/0363640 | A1  | *   | 12/2014 | Suga ..................... | B44C 1/1729 |
|              |     |     |         |                 | 428/201      |

FOREIGN PATENT DOCUMENTS

| JP | H1191041 A | * | 4/1999 |
| JP | 2001232660 A | * | 8/2001 |
| JP | 2002283506 A | * | 10/2002 |
| JP | 2004-155208 A | | 6/2004 |
| JP | 2006-272586 A | | 10/2006 |
| JP | 2007-261143 A | | 10/2007 |
| JP | 2007-268854 A | | 10/2007 |
| JP | 2008-094074 A | | 4/2008 |
| JP | 2008110532 A | * | 5/2008 |
| JP | 2010083043 A | * | 4/2010 |
| JP | 2011-046204 A | | 3/2011 |
| JP | 2012035512 A | * | 2/2012 |
| JP | 5055707 B2 | | 10/2012 |
| JP | 2012-213891 A | | 11/2012 |
| JP | 2015-054558 A | | 3/2015 |
| JP | 2015066856 A | * | 4/2015 |
| JP | 2015091664 A | * | 5/2015 | ............... C08J 5/18 |
| JP | 2017-119403 A | | 7/2017 |
| JP | 2018058219 A | * | 4/2018 |
| KR | 2015009092 A | | 1/2015 |
| WO | WO-2012147880 A1 | * | 11/2012 | ........... B32B 27/365 |
| WO | WO-2017209240 A1 | * | 12/2017 | ................ C08J 5/18 |

OTHER PUBLICATIONS

Machine Translation of JP 2008-110532 via EPO (Year: 2008).*
Machine Translation of JP 2018-058219 via EPO (Year: 2018).*
Machine Translation of WO 2012/147880 via WIPO (Year: 2012).*
Machine Translation of JP 2001-232660 via EPO (Year: 2001).*
Machine Translation of JP 2012-035512 via EPO (Year: 2012).*
Machine Translation of JP 2015-091664 via EPO (Year: 2015).*
Machine Translation of WO 2017/209240 via EPO (Year: 2017).*
Machine translation of JP H1191041 via EPO (Year: 1999).*
Machine translation of JP 2015-066856 via EPO (Year: 2015).*
Machine translation of JP 2002-283506 via EPO (Year: 2002).*
International Searching Authority, "International Search Report," issued in connection with International Patent Application No. PCT/JP2019/017429, dated Jul. 16, 2019.
International Searching Authority, "Written Opinion," issued in connection with International Patent Application No. PCT/JP2019/017429, dated Jul. 16, 2019.
European Search Report issued for EP Appl. Ser. No. 19793213.0 dated Jul. 8, 2021 (12 pages).
Office Action issued in JP Patent Application No. 2018-084414 dated Mar. 29, 2022 (7 pages).
Alvaredo-Atienza et al., "Fabrication and Characterization of PEEK/PEI Multilayer Composites", doi :10.3390/polym12122765 (Year: 2020).
Non-Final Office Action issued in corresponding U.S. Appl. No. 17/824,493, dated Oct. 24, 2022.
Office Action issued in corresponding European Patent Application No. 21182665.6, dated Nov. 2, 2022.
Office Action issued in corresponding Japanese Patent Application No. 2018-191838, dated Oct. 25, 2022.

* cited by examiner

DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/017429, filed on Apr. 24, 2019, which is based upon and claims the benefit of priority to Japanese Patent Applications Nos. 2018-084414, filed on Apr. 25, 2018; 2018-191838, filed on Oct. 10, 2018; 2018-191839, filed on Oct. 10, 2018; and 2019-070717, filed on Apr. 2, 2019; the disclosures of which are all incorporated herein by reference in their entireties.

BACKGROUND

Technical Field

The present invention relates to a decorative sheet.

Background Art

Conventionally, for example, a decorative sheet comprising a substrate layer, and a thermoplastic resin layer that is provided on the side of the front surface of the substrate layer has been proposed (for example, see PTL 1). When the decorative sheet described in PTL 1 is used, the decorative sheet is inserted into a cavity, the inserted decorative sheet is pre-molded, and a molded article is prepared by filling the cavity with a resin in a fluid state to solidify the resin, and integrating the solidified resin and the pre-molded decorative sheet.

However, in the decorative sheet described in PTL 1, when the decorative sheet is not sufficiently heated during pre-molding and the decorative sheet is not sufficiently softened, whitening or cracks can occur at the edges due to insufficient conforming of the decorative sheet to the mold, or due to an uneven sheet thickness after pre-molding resulting from the decorative sheet being molded in a low-fluidity state. On the other hand, excessive heating of the decorative sheet during preforming may cause crystal melting, foaming, or the like.

[Citation List] [Patent Literature] PTL 1: JP 5055707 B2

SUMMARY OF THE INVENTION

Technical Problem

The present invention has been made in view of the above problems, and an object of the present invention is to provide a decorative sheet that has a wide allowable temperature range during molding, and has improved or even excellent moldability.

Solution to Problem

In order to improve or even solve the problems described above, an aspect of the present invention is a decorative sheet comprising: (a) a substrate layer; and (b) a thermoplastic resin layer that is provided on a side of a front surface of the pattern layer; wherein (c) when a test piece with a width of 8 mm is prepared from the decorative sheet and a storage modulus is measured for the prepared test piece with an initial chuck distance of 10.77 mm, at a start temperature of 30° C., an end temperature of 150° C., an environmental temperature that is changed at a temperature increase rate of 5° C./min, and a measurement frequency of 1.0 Hz, a ratio of a difference between the second storage modulus and a third storage modulus when the decorative sheet changes from the transition region to a rubbery flat region relative to a difference between a first storage modulus when the environmental temperature is 30° C. and a second storage modulus when the decorative sheet changes from a glassy region to a transition region is 3.5 or less.

Advantageous Effects of the Invention

According to the present invention, a decorative sheet can be provided that has a wide allowable temperature range during molding, and has improved or even excellent moldability.

DETAILED DESCRIPTION

Embodiments of the present invention will be described below with reference to the drawings. In the following description of the drawings to be referred, components identical with or similar to each other are given the same or similar reference signs. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. In addition, the drawings are exaggerated as appropriate to facilitate understanding.

Hereinafter, a decorative sheet according to embodiments of the present invention will be described with reference to the drawings.

1. First embodiment: Decorative sheet
1-1. Configuration
1-2. Method of manufacturing molded article
1-3. Examples
2. Second embodiment: Decorative sheet
2-1. Technical Problem
2-2. Configuration
2-3. Examples
3. Third embodiment: Decorative sheet for automobile interior
3-1. Technical Problem
3-2. Configuration 3-3. Method of manufacturing decorative sheet for automobile interior
3-4. Examples

1. FIRST EMBODIMENT: DECORATIVE SHEET

1-1. Configuration

Figure 1:
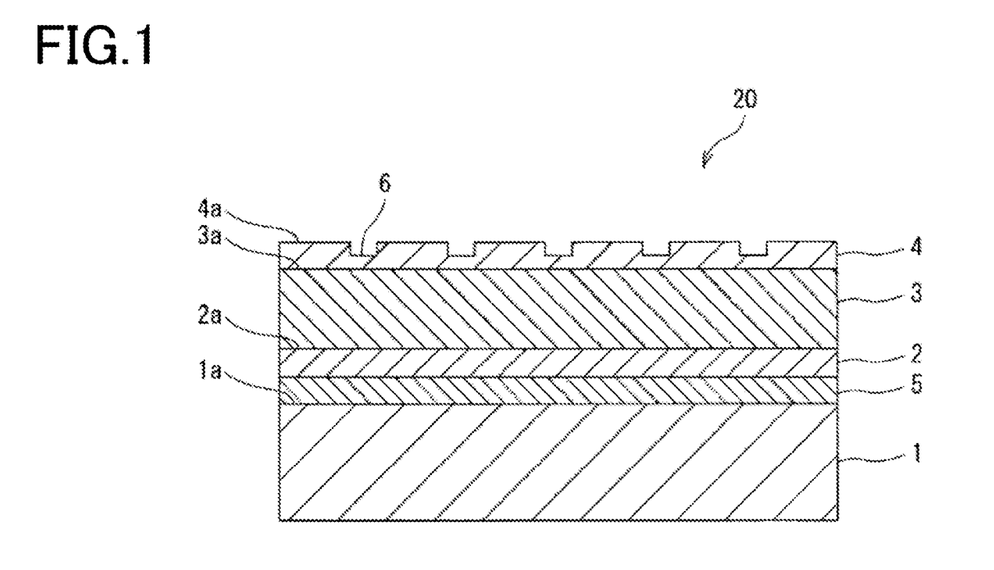
FIG. 1 is a cross-sectional view showing a decorative sheet according to a first and second embodiment.

As shown in FIG. 1, a decorative sheet 20 according to a first embodiment comprises a substrate layer 1, a pattern layer 2 that is provided on the side of a first front surface 1a of the substrate layer 1, and a thermoplastic resin layer 3 that is provided on the side of a second front surface 2a of the pattern layer 2. Although the total thickness of the decorative sheet 20 according to the first embodiment is not particularly limited, from the viewpoint of the surface strength and handling properties of the decorative sheet 20, it is preferably 255 µm or more and 550 µm or less, and more preferably 275 µm or more and 550 µm or less. Furthermore, from the viewpoint of the moldability and surface strength of the decorative sheet 20, the thickness ratio of the thermoplastic resin layer 3 to the substrate layer 1 is preferably 1:1.5 to 1:7, and more preferably 1:2.5 to 1:6. Specifically, from the viewpoint of stabilizing the sheet thickness of the flat parts and the corner portions, and preventing visual abnormalities, it is more preferable to satisfy both a total thickness of the decorative sheet 20 of 275 µm or more and 550 µm or less, and a thickness ratio of the thermoplastic resin layer 3 to the substrate layer 1 of 1:2.5 to 1:6. Moreover, for example, any one of a thermal laminating method, a dry laminating method, a hot melt laminating method, and an extrusion laminating method can be used as the method of laminating the substrate layer 1, the pattern layer 2, the thermoplastic resin layer 3, and the like.

Note that, in the present embodiment, an example is presented in which the decorative sheet 20 is formed by laminating the substrate layer 1, the pattern layer 2, and the thermoplastic resin layer 3 in this order, however other configurations can also be employed. For example, a configuration can be used in which the substrate layer 1, the thermoplastic resin layer 3, and the pattern layer 2 are laminated in this order.

Substrate Layer

The substrate layer 1 is a sheet-like layer that serves as a base of the decorative sheet 20. For example, at least one material selected from an acrylonitrile-butadiene-styrene copolymer synthetic resin (ABS), and polyester can be used as the material of the substrate layer 1. Examples of ABS resins that can be used include a polymer blend-type material containing a styrene-acrylonitrile copolymer and NBR (nitrile rubber), and a graft-type material obtained by graft copolymerizing styrene and acrylonitrile in the presence of BR (polybutadiene rubber) or SBR (styrene-butadiene rubber) latex. From the viewpoint of ease of stretching, the content ratio of butadiene is preferably 20% by weight or more and 50% by weight or less. Examples of polyesters that can be used include polytrimethylene terephthalate, polybutylene terephthalate, polyethylene naphthalate, and polybutylene naphthalate. The substrate layer 1 is a single layer. Furthermore, the thickness of the substrate layer 1 is preferably 196 µm or more and 413 µm or less.

Pattern Layer

The pattern layer 2 is a layer that provides the decorative sheet 20 with a design by means of a pattern. The pattern layer 2 is formed using printing ink, a coating agent, or the like. The printing ink or the like is not particularly limited, and the same printing inks as those used for the pattern layer in a conventional decorative sheet can be used. For example, an acrylic ink can be used. Examples of acrylic inks that can be used include a two-component curable urethane resin-based ink obtained by mixing an acrylic polyol-based vehicle with an isocyanate curing agent. Furthermore, examples of printing methods that can be used include a gravure printing method and an offset printing method. Furthermore, an arbitrary pattern can be used as the pattern, and examples include a wood grain pattern, a stone pattern, a cloth pattern, a cork pattern, an abstract pattern, a geometric pattern, and combinations of two or more of these.

Thermoplastic Resin Layer

At least one material selected from, for example, an acrylic resin, a polyolefin-based resin, and a vinyl chloride-based resin can be used as the material of the thermoplastic resin layer 3. Moreover, the thermoplastic resin layer 3 may be a single layer or multiple layers.

Note that, in consideration of the increasing social concern over environmental problems in recent years, it is not desirable to use a thermoplastic resin containing chlorine (a halogen) such as a vinyl chloride-based resin, and it is desirable to use a non-halogenated thermoplastic resin. Specifically, from the viewpoint of various physical properties, processability, versatility, and economy, it is preferable to use a polyolefin-based resin as the non-halogenated thermoplastic resin.

Furthermore, the most suitable polyolefin resins for general use are polypropylene-based resins, that is, a homopolymer or a copolymer containing propylene as the main component. For example, a homopolypropylene resin, a random polypropylene resin, a block polypropylene resin or the like may be used alone or appropriately mixed, and a resin in which atactic polypropylene is appropriately additionally mixed with these resins may be used. In addition, a copolymer containing an olefin-based monomer other than propylene, such as an α-olefin other than propylene having 2 to 20 carbon atoms and having a polypropylene crystal portion can be used, and a propylene-α-olefin copolymer containing 15 mol % or more of one or more types of comonomers among ethylene, 1-butene, 4-methyl-1-pentene, 1-hexene, and 1-octene can be preferably used. Also, a modifier which is typically used for softening polypropylene-based resins, such as low density polyethylene, ethylene-α-olefin copolymers, ethylene-propylene copolymer rubbers, ethylene-propylene-non-conjugated diene copolymer rubbers, styrene-butadiene copolymers, or a hydrogenated product thereof, can be added as appropriate.

Moreover, the thickness of the thermoplastic resin layer 3 is preferably 50 µm or more and 144 µm or less.

Other Layers

Like conventional decorative sheets, the decorative sheet 20 may appropriately include, for example, a surface protection layer 4, an adhesive layer 5, and the like in addition to the substrate layer 1, the pattern layer 2, and the thermoplastic resin layer 3. The surface protection layer 4 is provided on the side of a third front surface 3a of the thermoplastic resin layer 3. Furthermore, the adhesive layer 5 is provided between the substrate layer 1 and the pattern layer 2. In FIG. 1, the adhesive layer 5, the pattern layer 2, the thermoplastic resin layer 3, and the surface protection layer 4 are laminated in this order on the first front surface 1a of the substrate layer 1.

Moreover, an uneven pattern 6 formed by embossing may be appropriately provided on the outermost surface of the decorative sheet 20, that is, a fourth front surface 4a of the surface protection layer 4. Examples of the uneven pattern 6 that can be used include a pattern which is aligned with the pattern of the pattern layer 2, and a pattern which is not aligned with the pattern.

Surface Protection Layer

The surface protection layer 4 is a layer that is provided as necessary to protect the surface of the decorative sheet 20. The material of the surface protection layer 4 is not particularly limited, and the same materials as those used for the surface protection layer in conventional decorative sheets can be used. For example, acrylic urethane-based resins, ionizing radiation curing resins, and fluororesins can be used. Examples of acrylic urethane-based resins that can be used include a reaction product obtained by using an acrylic polyol compound as the main agent, and an isocyanate compound as the curing agent. Furthermore, examples of ionizing radiation curable resins that can be used include a composition which contains at least one of a prepolymer, oligomer, or monomer having a polymerizable unsaturated bond such as a (meth)acryloyl group, which has the property of undergoing a crosslinking reaction upon irradiation with ionizing radiation. Examples of the ionizing radiation that can be used include an electron beam or ultraviolet rays. Furthermore, examples of fluororesin that can be used include PVDF (polyvinylidene fluoride).

Adhesive Layer

The adhesive layer 5 is a layer that is provided as necessary to bond the substrate layer 1 and the thermoplastic resin layer 3 together. The material of the adhesive layer 5 is not particularly limited, and the same materials (adhesive agents) as those used for the adhesive layer in conventional decorative sheets can be used. For example, a heat seal can be used in which a vinyl chloride-acetate resin is mixed with an acrylic resin in a ratio of 60:40 to 70:30.

Uneven Pattern

The uneven pattern 6 is provided as necessary to provide the surface of the decorative sheet 20 with the sense of a three-dimensional design. An arbitrary uneven shape can be used as the uneven pattern 6, and examples include a wood grain vessel pattern, a stone pattern, a cloth pattern, an abstract pattern, a Japanese paper pattern, a suede pattern, a leather pattern, a satin pattern, a grain pattern, a hairline pattern, and combinations of these. Examples of methods that can be used to form the uneven pattern 6 include a doubling embossing method and an extrusion lamination simultaneous embossing method, which are performed before, after, or simultaneously with the lamination of the thermoplastic resin layer 3.

Storage Modulus

Figure 2:
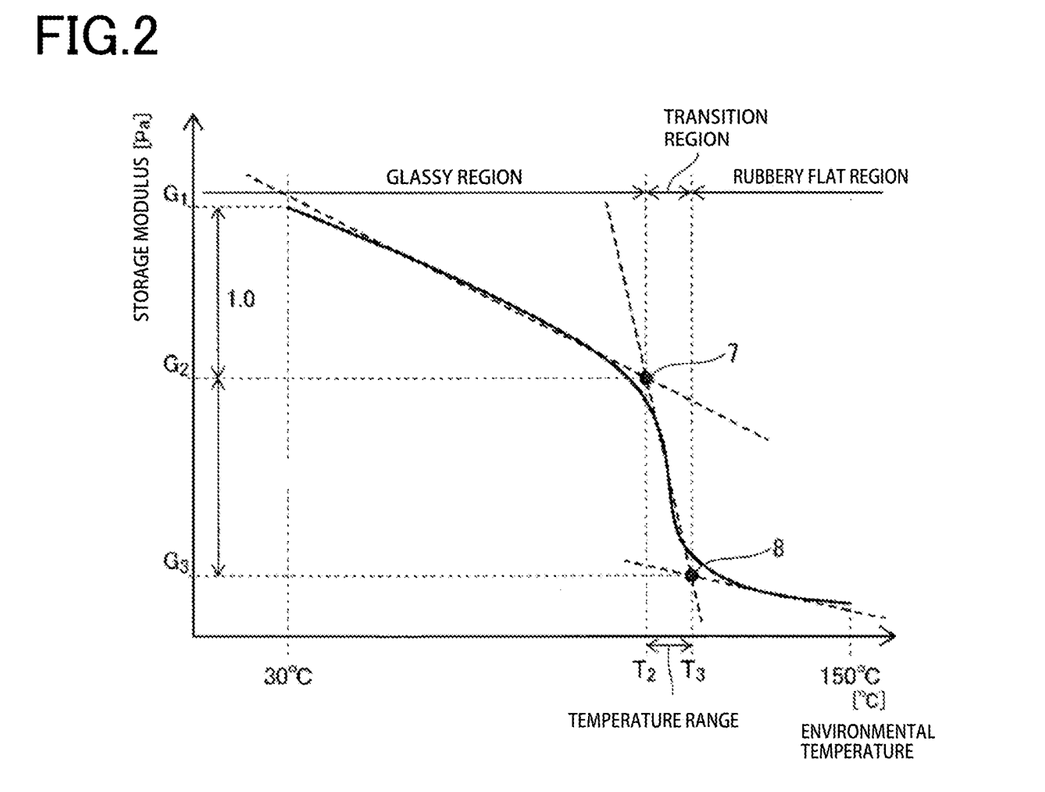
FIG. 2 is a graph showing the relationship between the environmental temperature and the storage modulus.

In the decorative sheet 20 according to the first embodiment, various parameters of the decorative sheet 20 are adjusted so that the storage modulus satisfies the following condition. The condition to be satisfied is that, when a test piece with a width of 8 mm is prepared from the decorative sheet 20 and a storage modulus is measured for the prepared test piece with an initial chuck distance of 10.77 mm, at a start temperature of 30° C., an end temperature of 150° C., an environmental temperature that is changed at a temperature increase rate of 5° C./min, and a measurement frequency of 1.0 Hz, as shown in FIG. 2, a ratio R ($=(G_2-G_3)/(G_1-G_2)$) of a difference ($G_2-G_3$) between the second storage modulus $G_2$ and a third storage modulus $G_3$ when the decorative sheet 20 changes from the transition region to a rubbery flat region relative to a difference ($G_1-G_2$) between a first storage modulus $G_1$ when the environmental temperature is 30° C. and a second storage modulus $G_2$ when the decorative sheet 20 changes from a glassy region to a transition region becomes a predetermined value or less. For example, the predetermined value is preferably 3.5, more preferably 2.5, and most preferably 2.0. Furthermore, the lower limit of the ratio R is preferably 0.1 or more, more preferably 0.5 or more, and most preferably 1.0 or more. When the ratio R is smaller than 0.1, the elastic modulus is low, which may cause a reduction in the scratch resistance or cause defective molding due to insufficient softening upon heating.

Examples of methods that can be used to calculate the second storage modulus $G_2$ include a method which is based on a point of intersection 7 between an approximate straight line between the temperature and the storage modulus in the glassy region and an approximate straight line between the temperature and the storage modulus in the transition region, and calculates the storage modulus according to the point of intersection 7. Furthermore, examples of methods that can be used to calculate the third storage modulus $G_3$ include a method which is based on a point of intersection 8 between an approximate straight line between the temperature and the storage modulus in the transition region and an approximate straight line between the temperature and the storage modulus in the rubbery flat region, and calculates the storage modulus according to the point of intersection 8.

1-2. Method of Manufacturing Molded Article

The decorative sheet 20 according to the first embodiment can be laminated onto an adherend made of a resin or the like, enabling the preparation of a molded article in which the adherend is decorated. Examples of methods that can be used to manufacture the molded article include an IML (Insert Molding Laminate) molding method, an injection molding simultaneous lamination method, and a TOM (Three-dimensional Overlay Method) molding method.

For example, the IML molding method is a method of preparing a molded article by forming a surface portion of the molded article with the decorative sheet 20 by vacuum molding, pressure molding, or the like, and then fitting the decorative sheet 20 forming the surface portion into an injection molding die, injecting a resin onto the rear surface side of the decorative sheet 20, and integrating the resin (adherend) and the decorative sheet 20. Furthermore, for example, the TOM molding method is a method of preparing a molded article by laminating the decorative sheet 20 by vacuum molding, pressure molding, or the like onto a pre-molded resin, and then integrating the resin (adherend) and the decorative sheet 20.

As described above, the decorative sheet 20 according to the first embodiment is a sheet comprising a substrate layer 1, a pattern layer 2 that is provided on the side of the first front surface 1a of the substrate layer 1, and a thermoplastic resin layer 3 that is provided on the side of the second front surface 2a of the pattern layer 2. Further, when a test piece with a width of 8 mm is prepared from the decorative sheet 20 and the storage modulus is measured for the prepared test piece with an initial chuck distance of 10.77 mm, at a start temperature of 30° C., an end temperature of 150° C., a temperature increase rate of 5° C./min, and a measurement frequency of 1.0 Hz, the ratio R ($=(G_2-G_3)/(G_1-G_2)$) of the difference ($G_2-G_3$) between the second storage modulus $G_2$ and a third storage modulus $G_3$ when the decorative sheet 20 changes from the transition region to a rubbery flat region relative to the difference ($G_1-G_2$) between a first storage modulus $G_1$ when the environmental temperature is 30° C. and a second storage modulus $G_2$ when the decorative sheet 20 changes from a glassy region to a transition region is 3.5 or less. Therefore, a decorative sheet 20 can be provided that has a wide allowable temperature range (molding temperature range) during molding, and has improved or even excellent moldability. In addition, because of the improved or even excellent moldability, whitening or cracks at the edges, crystal melting, foaming, and the like are unlikely to occur, and a design can be suitably provided to the molded article.

In addition, when the ratio R ($=(G_2-G_3)/(G_1-G_2)$) is greater than 3.5, the elastic modulus abruptly changes when the temperature reaches the transition region, which may cause a sheet breakage due to excessive heating. Furthermore, if the decorative sheet 20 is insufficiently heated due to fear of a sheet breakage due to excessive heating, the decorative sheet 20 may insufficiently conform to the mold, or whitening may occur due to insufficient heating. That is, the allowable temperature range (molding temperature range) at the time of molding may become narrow. Also, when the environmental temperature reaches the temperature $T_2$ at which the storage modulus becomes "$G_2$", the heat resistance of the product may become low. In contrast, when the ratio R ($=(G_2-G_3)/(G_1-G_2)$) is 3.5 or less, because the transition region is widened to some extent and the environmental temperature $T_2$ at which the storage modulus becomes "$G_2$" is also not too low, a decorative sheet 20 having heat resistance and improved or even excellent moldability can be obtained.

Moreover, when the ratio R is 3.5 or less but greater than 3.0, there is still a need to perform molding within a relatively narrow temperature range due to the concern that a sheet breakage or insufficient conforming to the mold may occur in a similar fashion to the case where the ratio R is greater than 3.5, and there is also a possibility that problems may occur when the temperature conditions fluctuate for some reason. In contrast, when the ratio R is 3.0 or less, the change in the storage modulus in the transition region is more gradual, and it is possible to obtain an effect in which the possibility of a defect occurring is reduced.

Furthermore, when the ratio R is 3.0 or less but greater than 2.0, the variation in film thickness after molding becomes large, and there is a possibility of a defect occurring such as "substrate transparency", in which the substrate to which the molded article is attached becomes transparent. In contrast, when the ratio R is 2.0 or less, the variation in the film thickness after molding can be reduced, and an effect can be obtained in which substrate transparency is unlikely to occur.

1-3. EXAMPLES

Hereinafter, Examples and Comparative Examples of the decorative sheet 20 according to the first embodiment will be described. Note that the present invention is not limited to the Examples described below.

Example 1

First, a PMMA film (manufactured by Mitsubishi Chemical Corporation) was prepared as the thermoplastic resin layer 3. The thickness of the PMMA film was 125 μm. Then, a pattern layer 2 made of acrylic ink and an adhesive layer 5 made of acrylic-vinyl chloride acetate were laminated in this order on one surface of the PMMA film by gravure printing to prepare a printed sheet. Next, the prepared printed sheet and the substrate layer 1 made of an ABS substrate were heat laminated to form a two-layer integrated structure. The thickness of the ABS substrate was 375 μm. Thus, the decorative sheet 20 was prepared.

Figure 3:
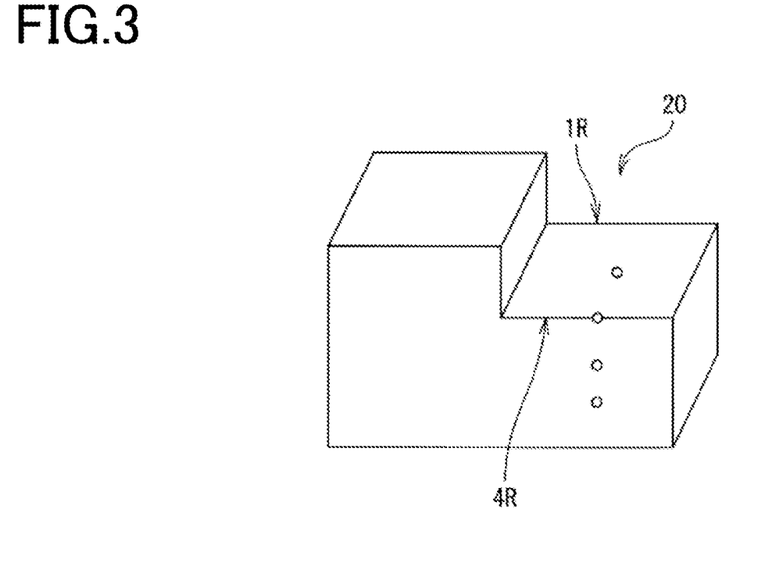
FIG. 3 is a perspective view showing a molded article that has been molded from a decorative sheet.

Next, the decorative sheet 20 was subjected to TOM molding using a TOM molding machine ("NGF-0406-T" manufactured by Fuse Vacuum Forming Co., Ltd.). Specifically, the mold and the decorative sheet 20 were firstly set inside a box, and after evacuation, pre-molding was performed by raising the temperature of the decorative sheet 20 to a set temperature (100° C., 110° C., or 120° C.) using a heater. Then, after raising the temperature of the decorative sheet 20, a pressure of 0.3 MPa was applied to form a molded article. Next, after air cooling, the molded article was removed from the mold. As a result of the TOM molding, as shown in FIG. 3, the decorative sheet 20 was molded into a shape having a letter-L shape in side view, a rectangular shape in plan view, and a shape having a corner portion 4R.

Example 2

In Example 2, the other surface of the PMMA film, that is, the outermost layer of the decorative sheet 20, was provided with a surface protection layer 4 made of an acrylic urethane-based resin. Otherwise, the decorative sheet 20 and the molded article were prepared using the same conditions as in Example 1.

Example 3

In Example 3, a PP (polypropylene) film was used as the thermoplastic resin layer 3. Furthermore, the other surface of the thermoplastic resin layer 3, that is, the surface on the opposite side to the surface on which the pattern layer 2 was provided in Example 1, was provided with a pattern layer 2. In addition, PP was extruded on the front surface of the pattern layer 2 to provide a clear layer. Also, the outermost layer of the decorative sheet 20 was provided with a surface protection layer 4 made of an acrylic urethane-based resin. Moreover, the thickness of the ABS substrate (substrate layer 1) was 300 μm. Otherwise, the decorative sheet 20 and the molded article were prepared using the same conditions as in Example 1.

Example 4

In Example 4, the thickness of the PMMA film (thermoplastic resin layer 3) was 75 μm. Furthermore, the thickness of the ABS substrate (substrate layer 1) was 430 μm.

Otherwise, the decorative sheet 20 and the molded article were prepared using the same conditions as in Example 1.

Example 5

In Example 5, the thickness of the PMMA film (thermoplastic resin layer 3) was 50 μm. Furthermore, the thickness of the ABS substrate (substrate layer 1) was 430 μm. Otherwise, the decorative sheet 20 and the molded article were prepared using the same conditions as in Example 1.

Example 6

In Example 6, a co-extruded multilayer film (manufactured by Mitsubishi Chemical Corp.) comprising a PVDF layer and a PMMA layer was used as the thermoplastic resin layer 3 having a surface protection layer 4. The thickness of the PMMA layer was 50 μm. Furthermore, the thickness of the ABS substrate (substrate layer 1) was 430 μm. Otherwise, the decorative sheet 20 and the molded article were prepared using the same conditions as in Example 1.

Comparative Example 1

In Comparative Example 1, a PP film was used as the thermoplastic resin layer 3. The thickness of the PP film was 160 μm. Furthermore, the other surface of the thermoplastic resin layer 3, that is, the surface on the opposite side to the surface on which the pattern layer 2 was provided in Example 1, was provided with a pattern layer 2. In addition, PP was extruded on the front surface of the pattern layer 2 to provide a clear layer. Moreover, the outermost layer of the decorative sheet 20 was provided with a surface protection layer 4 made of an acrylic urethane-based resin. Also, a PETG (high-strength polyethylene terephthalate) film was used as the substrate layer 1. The thickness of the PETG film was 250 μm. Otherwise, the decorative sheet 20 and the molded article were prepared using the same conditions as in Example 1.

Performance Evaluation

The following performance evaluation was performed on the decorative sheets 20 of Examples 1 to 6 and Comparative Example 1.

Measurement of Tensile Modulus (Storage Modulus Coefficient)

First, a test piece with a width of 8 mm and a length of 15 mm was prepared from the decorative sheet 20. Then, a DMA machine (a "dynamic viscoelasticity measurement machine" manufactured by Perkin Elmer) was used to set the prepared test piece such that the initial chuck distance was 10.77 mm. Next, the storage modulus was measured for the set test piece with a start temperature of 30° C., an end temperature of 150° C., an environmental temperature that is changed at a temperature increase rate of 5° C./min, and a measurement frequency of 1.0 Hz, and as shown in FIG. 2, the ratio R $(=(G_2-G_3)/(G_1-G_2))$ of the difference $(G_1-G_2)$ between the first storage modulus $G_1$ when the environmental temperature is 30° C. and the second storage modulus $G_2$ when the decorative sheet 20 changes from a glassy region to a transition region to the difference $(G_2-G_3)$ between the second storage modulus $G_2$ and the third storage modulus $G_3$ when the decorative sheet 20 changes from the transition region to a rubbery flat region was calculated. Furthermore, at the same time, the temperature range $(=T_3-T_2)$ was calculated, which represents the difference between the environmental temperature $T_3$ at which the storage modulus of the decorative sheet 20 reaches the third storage modulus G3, and the environmental temperature $T_2$ at which it reaches the second storage modulus $G_2$.

First Post-Molding Thickness Difference Test

In the first post-molding thickness difference test, the moldability of the molded article was tested when the temperature of the decorative sheet 20 varied during molding. Specifically, the thickness of the corner portion 4R of the decorative sheet 20 was measured for each of the molded articles formed using different molding temperatures (100° C., 110° C., and 120° C.). Further, a difference of 20 μm or less was classified as a pass (excellent), a difference greater than 20 μm and 60 μm or less was classified as a pass (good), a difference greater than 60 μm and and 120 μm or less was classified as a pass (fair), and a difference of greater than 120 μm was classified as a fail (poor). Although it is dependent on the total thickness of the decorative sheet 20, the reason for setting 120 μm as the threshold for classification as a pass (excellent), (good), (fair), or a fail (poor) is that, when a variation in the thickness of greater than 120 μm occurs, a deterioration in the appearance and a reduction in the physical properties (such as the scratch resistance) occurs due to the decorative sheet 20 becoming thinner.

Second Post-Molding Thickness Difference Test

In the second post-molding thickness difference test, the moldability of the molded article was tested to confirm the variation in the thickness that occurs in a single molded article when molding of the decorative sheet 20 was performed at certain temperatures. Specifically, the thicknesses at the positions indicated by circles in FIG. 3, that is, the thickness of the upper surface, the thickness of the corner portion 4R, and the thicknesses at two points on the side surface aligned in the vertical direction were measured for a molded article obtained by molding the decorative sheet 20 at a molding temperature of 100° C., and the difference between the maximum value and the minimum value among the four measured thicknesses was calculated. Further, a difference of 100 μm or less was classified as a pass (excellent), a difference greater than 100 μm and 110 μm or less was classified as a pass (good), a difference greater than 110 μm and 120 μm or less was classified as a pass (fair), and a difference of greater than 120 μm was classified as a fail (poor).

Evaluation Results

The evaluation results are shown in Table 1 below.

TABLE 1

|  | Example 1 | Example 2 | Example 3 | Example 4 | Example 5 | Example 6 | Comparative Example 1 |
|---|---|---|---|---|---|---|---|
| Resin of thermoplastic resin layer/ resin of substrate layer | PMMA/ABS | PMMA/ABS | PP/ABS | PMMA/ABS | PMMA/ABS | PMMA/ABS | PP/PETG |
| Thickness of thermoplastic resin layer/ thickness of substrate layer [μm] | 125/375 | 125/375 | 125/375 | 75/430 | 50/430 | 50/430 | 160/250 |

TABLE 1-continued

|  | Example 1 | Example 2 | Example 3 | Example 4 | Example 5 | Example 6 | Comparative Example 1 |
|---|---|---|---|---|---|---|---|
| Surface protection layer provided | No | Yes (acrylic urethane-based resin) | Yes (acrylic urethane-based resin) | No | No | Yes (PVDF) | Yes (acrylic urethane-based resin) |
| Ratio R | 0.79 | 1.36 | 1.48 | 2.33 | 3.20 | 3.4 | 3.6 |
| Temperature range ($T_3$-$T_2$) | 14.7° C. | 16.3° C. | 16.2° C. | 13.5° C. | 13.7° C. | 12.0° C. | 10.7° C. |
| First post-molding thickness difference Test result [μm] | Excellent (6) | Excellent (12) | Excellent (19) | Good (21) | Fair (61) | Fair (119) | Poor (121) |
| Second post-molding thickness difference Test result [μm] | Excellent (97) | Good (102) | Good (108) | Fair (112) | Fair (114) | Fair (118) | Poor (121) |
| Overall evaluation | Excellent | Good | Good | Fair | Fair | Fair | Poor |

As shown in Table 1, in the decorative sheets 20 of Examples 1 to 6, the ratio R (=($G_2$-$G_3$)/($G_1$-$G_2$)) was less than 3.5. Furthermore, the first post-molding thickness difference test and the second post-molding thickness difference test resulted in a pass (excellent), (good), or (fair), and the overall evaluation resulting from the results of these tests was a pass (excellent), (good), or (fair). On the other hand, in the decorative sheet 20 of Comparative Example 1, the ratio R was greater than 3.5. Furthermore, the first post-molding thickness difference test and the second post-molding thickness difference test resulted in a fail (poor), and the overall evaluation resulting from the results of these tests was a fail (poor).

Therefore, it was confirmed that, compared to the decorative sheet 20 of Comparative Example 1, the decorative sheets 20 of Examples 1 to 6 have a wide allowable temperature range (molding temperature range) during molding, and have improved or even excellent moldability.

2. SECOND EMBODIMENT: DECORATIVE SHEET

Next, a decorative sheet according to a second embodiment of the present invention will be described.

2-1. Technical Problem

Conventionally, for example, a decorative sheet comprising an ABS substrate layer, and a thermoplastic resin layer that is provided on the side of the front surface of the ABS substrate layer has been proposed (for example, see JP 5055707 B). In the decorative sheet described in JP 5055707 B, the decorative sheet is inserted into a cavity, and a molded article is prepared by filling a resin in a fluid state into the cavity to solidify the resin, and integrating the solidified resin and the pre-molded decorative sheet. However, the present inventors have discovered that, in the decorative sheet described in JP 5055707 B, when the sheet temperature at the time of molding varies, a variation occurs in the sheet thickness of the decorative sheet in the molded article.

The decorative sheet according to the second embodiment has an object of providing a decorative sheet whose sheet thickness can be stabilized in a molded article, even when the sheet temperature varies at the time of molding.

2-2. Configuration

The overall configuration of the decorative sheet 20 of the second embodiment is the same as FIG. 1. That is, as shown in FIG. 1, the decorative sheet 20 according to the second embodiment comprises a substrate layer 1, and a thermoplastic resin layer 3 that is provided on the side of the first front surface 1a of the substrate layer 1. The total thickness of the decorative sheet 20 according the second embodiment is preferably 255 μm or more and 550 μm or less, and more preferably 275 μm or more and 550 μm or less. Furthermore, from the viewpoint of the moldability and surface strength of the decorative sheet 20, the thickness ratio of the thermoplastic resin layer 3 to the substrate layer 1 is preferably 1:1.5 to 1:7, and more preferably 1:2.5 to 1:6. Specifically, from the viewpoint of stabilizing the sheet thickness of the flat parts and the corner portions, and preventing visual abnormalities, it is more preferable to satisfy a total thickness of the decorative sheet 20 of 275 μm or more and 550 μm or less, and a thickness ratio of the thermoplastic resin layer 3 to the substrate layer 1 of 1:2.5 to 1:6. Moreover, in terms of the lamination methods of layers such as the substrate layer 1, the pattern layer 2, and the thermoplastic resin layer 3, it is possible to use the same lamination methods as those used for the layers of the decorative sheet 20 of the first embodiment.

In addition, among the layers used in the second embodiment, the substrate layer 1 and the thermoplastic resin layer 3 use the layers described below, and the other layers are the same as the layers used in the first embodiment.

Substrate Layer

Examples of materials that can be used for the substrate layer 1 of the second embodiment include an ABS resin. Examples of ABS resins that can be used include a polymer blend-type material containing a styrene-acrylonitrile copolymer and NBR, or a graft-type material obtained by graft copolymerizing styrene and acrylonitrile in the presence of BR or SBR latex. From the viewpoint of ease of stretching, the content ratio of butadiene is preferably 20% by weight or more and 50% by weight or less. Furthermore, the substrate layer 1 of the second embodiment may be a single layer or multiple layers. Moreover, like the substrate layer 1 of the first embodiment, the thickness of the substrate layer 1 of the second embodiment is preferably 196 μm or more and 413 μm or less.

Thermoplastic Resin Layer

At least one of a polymethylmethacrylate resin, a polypropylene resin, and a polyvinyl chloride resin can be used as the material of the thermoplastic resin layer 3 of the second embodiment. Furthermore, the thermoplastic resin layer 3 of the second embodiment may be a single layer or multiple layers. Moreover, like the thermoplastic resin layer 3 of the first embodiment, the thickness of the thermoplastic resin layer 3 of the second embodiment is preferably 50 μm or more and 144 μm or less.

As described above, the decorative sheet 20 according to the second embodiment comprises a substrate layer 1, and a thermoplastic resin layer 3 that is provided on the side of the first front surface 1a of the substrate layer 1. Furthermore, the substrate layer 1 contains an ABS resin. Further, the total thickness of the decorative sheet 20 is 255 μm or more and 550 μm or less, and the thickness ratio of the thermoplastic resin layer 3 to the substrate layer 1 is 1:1.5 to 1:7. Therefore, because the thicknesses of the substrate layer 1 and the thermoplastic resin layer 3 and the thickness ratio thereof are appropriate, a decorative sheet 20 can be provided in which the sheet thickness is stabilized in the molded article, even when the sheet temperature varies at the time of molding.

Furthermore, for example, even if a variation occurs in the temperature at each part of the decorative sheet 20, it is possible to prevent the occurrence of extremely stretched portions, and to prevent the thickness of the decorative sheet 20 from becoming uneven. Therefore, a decorative sheet 20 can be provided that has a wide range of possible molding temperatures.

Moreover, the moldability can be stabilized even if the molding machine or the molding conditions change.

Also, by using a decorative sheet 20 that is unlikely to have an uneven thickness, it is possible to prevent the strength of the molded article from varying from position to position, and further, changes in the design can also be prevented.

In addition, when the total thickness of the decorative sheet 20 is smaller than 255 μm, the surface strength of the decorative sheet 20 decreases. Furthermore, when the total thickness of the decorative sheet 20 is larger than 550 μm, the handling properties of the decorative sheet 20 deteriorate. Moreover, if the ratio of the thickness of the substrate layer 1 to the thickness of the thermoplastic resin layer 3 is less than 1.5, the moldability becomes poor. Also, if the ratio of the thickness of the substrate layer 1 to the thickness of the thermoplastic resin layer 3 is greater than 7, the surface strength of the decorative sheet 20 decreases.

2-3. EXAMPLES

Hereinafter, Examples and Comparative Examples of the decorative sheet 20 according to the second embodiment will be described. Note that the present invention is not limited to the Examples described below.

Example 1

First, an acrylic film primary sheet and an ABS substrate were prepared as the thermoplastic resin layer 3 and the substrate layer 1. The thickness of the acrylic film primary sheet was 125 μm. Furthermore, the thickness of the ABS substrate was 380 μm. Then, the acrylic film primary sheet and the ABS substrate were thermally laminated to prepare a decorative sheet 20 having a total thickness of 505 μm. Next, after using a TOM molding machine ("NGF-0406-T" manufactured by Fuse Vacuum Forming Co., Ltd.) to heat the decorative sheet 20 to a set temperature in a vacuum environment, vacuum molding was carried out on one surface of the decorative sheet 20. Three set temperatures (molding temperatures) of 100° C., 110° C., and 120° C. were used. As a result of the vacuum molding, as shown in FIG. 3, the decorative sheet 20 was molded into a shape having a letter-L shape in side view, a rectangular shape in plan view, and a shape having a corner portion 1R and a corner portion 4R.

Thus, the surface portion of the molded article used in the IML molding method was prepared.

Example 2

In Example 2, the thickness of the thermoplastic resin layer 3 was 75 μm, the thickness of the substrate layer 1 was 200 μm, and the total thickness of the decorative sheet 20 was 275 μm. Otherwise, the decorative sheet 20 and the surface portion of the molded article were prepared using the same conditions as in Example 1.

Example 3

In Example 3, a polypropylene primary sheet was used as the thermoplastic resin layer 3. Furthermore, the thickness of the thermoplastic resin layer 3 was 90 μm, the thickness of the substrate layer 1 was 380 μm, and the total thickness of the decorative sheet 20 was 470 μm. Otherwise, the decorative sheet 20 and the surface portion of the molded article were prepared using the same conditions as in Example 1.

Example 4

In Example 4, a laminate in which an acrylic film primary sheet having a thickness of 75 μm and a polyvinyl chloride resin having a thickness of 40 μm were laminated was used as the thermoplastic resin layer 3. Furthermore, the thickness of the substrate layer 1 was 380 μm, and the total thickness of the decorative sheet 20 was 495 μm. Otherwise, the decorative sheet 20 and the surface portion of the molded article were prepared using the same conditions as in Example 1.

Example 5

In Example 5, the thickness of the thermoplastic resin layer 3 was 125 μm, the thickness of the substrate layer 1 was 200 μm, and the total thickness of the decorative sheet 20 was 325 μm. Otherwise, the decorative sheet 20 and the surface portion of the molded article were prepared using the same conditions as in Example 1.

Example 6

In Example 6, the thickness of the thermoplastic resin layer 3 was 75 μm, the thickness of the substrate layer 1 was 430 μm, and the total thickness of the decorative sheet 20 was 505 μm. Otherwise, the decorative sheet 20 and the surface portion of the molded article were prepared using the same conditions as in Example 1.

Example 7

In Example 7, the thickness of the thermoplastic resin layer 3 was 75 μm, the thickness of the substrate layer 1 was 180 μm, and the total thickness of the decorative sheet 20 was 255 μm. Otherwise, the decorative sheet 20 and the surface portion of the molded article were prepared using the same conditions as in Example 1.

Comparative Example 1

In Comparative Example 1, a polypropylene primary sheet was used as the thermoplastic resin layer 3. Furthermore, a PETG substrate was used as the substrate layer 1. Furthermore, the thickness of the thermoplastic resin layer 3 was 160 μm, the thickness of the substrate layer 1 was 350 μm, and the total thickness of the decorative sheet 20 was 510 μm. Otherwise, the decorative sheet 20 and the surface portion of the molded article were prepared using the same conditions as in Example 1.

Comparative Example 2

In Comparative Example 2, a PETG film was used as the substrate layer 1. Furthermore, the thickness of the thermoplastic resin layer 3 was 125 μm, the thickness of the substrate layer 1 was 120 μm, and the total thickness of the decorative sheet 20 was 245 μm. Otherwise, the decorative sheet 20 and the surface portion of the molded article were prepared using the same conditions as in Example 1.

Comparative Example 3

In Comparative Example 3, the thickness of the thermoplastic resin layer 3 was 50 μm, the thickness of the substrate layer 1 was 180 μm, and the total thickness of the decorative sheet 20 was 230 μm. Otherwise, the decorative sheet 20 and the surface portion of the molded article were prepared using the same conditions as in Example 1.

Comparative Example 4

In Comparative Example 4, the thickness of the thermoplastic resin layer 3 was 125 μm, the thickness of the substrate layer 1 was 400 μm, and the total thickness of the decorative sheet 20 was 525 μm. Otherwise, the decorative sheet 20 and the surface portion of the molded article were prepared using the same conditions as in Example 1.

Comparative Example 5

In Comparative Example 5, the thickness of the thermoplastic resin layer 3 was 125 μm, the thickness of the substrate layer 1 was 180 μm, and the total thickness of the decorative sheet 20 was 305 μm. Otherwise, the decorative sheet 20 and the surface portion of the molded article were prepared using the same conditions as in Example 1.

Comparative Example 6

In Comparative Example 6, the thickness of the thermoplastic resin layer 3 was 50 μm, the thickness of the substrate layer 1 was 380 μm, and the total thickness of the decorative sheet 20 was 430 μm. Otherwise, the decorative sheet 20 and the surface portion of the molded article were prepared using the same conditions as in Example 1.

Performance Evaluation

The following performance evaluation was performed on the decorative sheets 20 of Examples 1 to 7 and Comparative Examples 1 to 6.

First Thickness Test

In the first thickness test, it was tested whether the sheet thickness of the molded article was stable when a variation in the temperature of the decorative sheet 20 occurred at the time of molding. Specifically, the difference between the thickness of the decorative sheet 20 molded at a set temperature (molding temperature) of 100° C. and the thickness of the decorative sheet 20 molded at a molding temperature of 110° C. was calculated. Furthermore, the difference between the thickness of the decorative sheet 20 molded at a molding temperature of 120° C. and the thickness of the decorative sheet 20 molded at a molding temperature of 110° C. was calculated. Then, cases where the differences were within a range of ±15% were classified as a pass (good), and cases where the differences were outside a range of ±15% were classified as a fail (poor).

In the thickness measurement of the decorative sheet 20, a digital micrometer (manufactured by Mitutoyo Corp.) was used for the upper surface (flat portion) of the molded article, and a point digital micrometer ("MCD232-25P" manufactured by Niigata Seiki Co., Ltd.) was used for the corner portions (curved portions) of the molded article. Then, according to the thickness measurement method of JIS K 7130 A, the thickness of the corner portion which extends from the upper surface of the molded article to the side surface was measured by taking the thickness of the decorative sheet 20 molded at 110° C., that is, the thickness of the upper surface of the molded article (the position of the sheet which is stretched the least) as 100%, and then measuring the thicknesses of the decorative sheets 20 molded at ±10° C. (100° C. and 120° C.) using this value as the center value.

Appearance Test

In the appearance test, it was examined whether any abnormalities occurred in the appearance of the molded article when a variation in the temperature of the decorative sheet 20 occurred at the time of molding. Further, cases where an abnormality such as foaming, cracking, or whitening did not occur in the external appearance were classified as a pass (good), and cases where an abnormality such as foaming, cracking, or whitening did occur were classified as a fail (poor).

Second Thickness Test

In the second thickness test, the difference between the thickness of the corner portion 1R and the thickness of the corner portion 4R was calculated for each of the molded articles molded at different molding temperatures (100° C., 110° C., and 120° C.). Then, cases where the differences were within a range of ±50 μm were classified as a pass (good), and cases where the differences were outside a range of ±50 μm were classified as a fail (poor).

Coin Scratch Test

In the coin scratch test, the decorative sheet 20 of the upper surface (flat section) of the molded article was scratched with a coin with an applied load of 2 kg. Then, cases where the decorative sheet 20 was not scratched were classified as a pass (excellent), cases where a thin linear scratch was formed were classified as a pass (good), cases where a shallow scratch deeper than a linear scratch was formed were classified as a fail (fair), and cases where a deep scratch was formed were classified as a fail (poor).

Evaluation Results

The evaluation results are shown in Table 2 below.

TABLE 2

|  | First thickness test | | Appearance test Molding temperature | | Second thickness test | | | Coin scratch test | Overall evaluation |
| --- | --- | --- | --- | --- | --- | --- | --- | --- | --- |
|  | 100° C. | 120° C. | 100° C. | 120° C. | 100° C. | 110° C. | 120° C. | | |
| Example 1 | Good (4.0%) | Good (6.1%) | Good | Good | Good (−29) | Good (−3) | Good (−7) | Excellent | Good |
| Example 2 | Good | Good | Good | Good | Good | Good | Good | Excellent | Good |
| Example 3 | Good | Good | Good | Good | Good | Good | Good | Good | Good |
| Example 4 | Good | Good | Good | Good | Good | Good | Good | Excellent | Good |
| Example 5 | Good | Good | Good | Good | Poor | Good | Good | Excellent | Good |
| Example 6 | Good | Good | Good | Poor | Good | Good | Poor | Good | Good |
| Example 7 | Good | Good | Poor | Good | Poor | Good | Good | Good | Good |
| Comparative Example 1 | Poor (16%) | Good (2.3%) | Good | Good | Poor (+83) | Good (−24) | Good (+17) | Good | Poor |
| Comparative Example 2 | Poor | Good | Poor | Good | Poor | Poor | Poor | Good | Poor |
| Comparative Example 3 | Fair | Fair | Poor | Poor | Fair | Fair | Fair | Fair | Poor |
| Comparative Example 4 | Fair | Fair | Good | Good | Fair | Good | Good | Good | Poor |
| Comparative Example 5 | Good | Good | Poor | Poor | Poor | Poor | Poor | Good | Poor |
| Comparative Example 6 | Poor | Poor | Good | Good | Fair | Fair | Fair | Poor | Poor |

As shown in Table 2, in the decorative sheets 20 of Examples 1 to 7, the overall evaluation resulting from the test results of the first thickness test, the appearance test, the second thickness test, and the coin scratch test was a pass (good). On the other hand, in the decorative sheets 20 of Comparative Examples 1 to 6, the overall evaluation resulting from the test results of the first thickness test, the appearance test, the second thickness test, and the coin scratch test was a fail (poor).

Therefore, it was confirmed that, compared to the decorative sheets 20 of Comparative Examples 1 to 6, decorative sheets 20 of Examples 1 to 7 enable the sheet thickness of the molded article to be stabilized, even when the sheet temperature at the time of molding varies. Furthermore, it was confirmed that, even if a variation occurs in the temperature at each part of the decorative sheet 20, it is possible to prevent the occurrence of excessively stretched portions, and to prevent the thickness of the decorative sheet 20 from becoming uneven.

Moreover, in the decorative sheets 20 of Examples 1 to 4, that is, in a decorative sheet 20 in which the total thickness of the decorative sheet 20 is 275 μm or more and 550 μm or less, and the thickness ratio of the thermoplastic resin layer 3 to the substrate layer 1 is 1:2.5 to 1:6, it was confirmed that the first thickness test, the appearance test, the second thickness test, and the coin scratch test all resulted in a pass (excellent) or a pass (good). In addition, it was confirmed that, compared to the decorative sheets 20 of Comparative Examples 3 and 6, the decorative sheets 20 of Examples 1 to 7 have a strong surface strength, and superior scratch resistance.

3. THIRD EMBODIMENT: DECORATIVE SHEET FOR AUTOMOBILE INTERIOR

Next, a decorative sheet for an automobile interior according to a third embodiment of the present invention will be described.

3-1. Technical Problem

Conventionally a decorative sheet for an automobile interior has been proposed in which a substrate, a heat sealing layer, a pattern layer, and a transparent film layer are laminated in this order (for example, see JP 2015-054558 A). In the decorative sheet for an automobile interior described in JP 2015-054558 A, a laminate, which includes a heat sealing layer, a pattern layer, and a transparent film layer, and a substrate are heated and laminated together by heat lamination. However, the present inventors have found that, in the decorative sheet for an automobile interior described in JP 2015-054558 A, for example, during heat lamination at low temperature, air entrapment occurs as a result of air becoming trapped at the interface between the pattern layer and the substrate due to the unevenness of ink dots in the pattern layer, and the air entrapment causes the appearance to deteriorate.

The decorative sheet for an automobile interior according to the third embodiment has an object of providing a decorative sheet for an automobile interior which is capable of suppressing deterioration of the appearance due to air entrapment as described above.

3-2. Configuration

Figure 4:
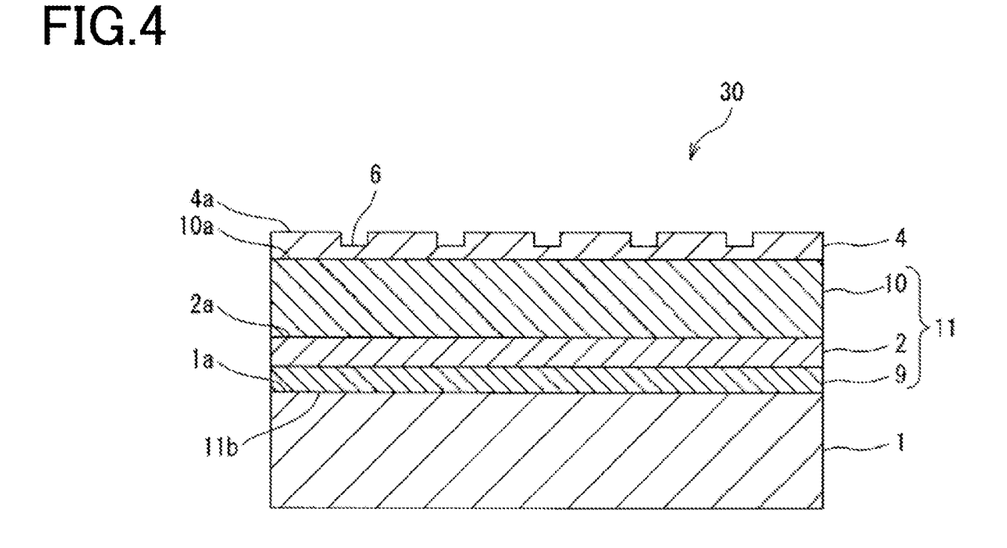
FIG. 4 is a cross-sectional view showing a decorative sheet for an automobile interior according to a third embodiment.

As shown in FIG. 4, the overall configuration of a decorative sheet for an automobile interior 30 according to the third embodiment includes a heat sealing layer 9 instead of the adhesive layer 5 of the second embodiment, and a transparent film layer 10 instead of the thermoplastic resin layer 3 of the second embodiment. That is, the configuration includes a substrate layer 1, a heat sealing layer 9 that is provided on a side of a first front surface 1a of the substrate layer 1, a pattern layer 2 that is provided on the side of a ninth front surface 9a of the heat sealing layer 9, a transparent film layer 10 that is provided on the side of a second front surface 2a of the pattern layer 2, and a surface protection layer 4 that is provided on the side of a tenth front surface 10a of the transparent film layer 10.

Furthermore, in terms of the total thickness of the decorative sheet for an automobile interior 30 according to the third embodiment, the thickness ratio between the thermoplastic resin layer 3 and the substrate layer 1, and lamination method of each layer, the same values as those used in the decorative sheet 20 according to the first embodiment can be used. In addition, among the layers used in the third embodiment, the heat sealing layer 9, the pattern layer 2, the transparent film layer 10, and the surface protection layer 4 use the layers described below, and the other layers are the same as the layers used in the first embodiment.

Heat Sealing Layer

The heat sealing layer 9 is a layer for laminating a laminate 11, which includes the heat sealing layer 9, the pattern layer 2, and the transparent film layer 10, and the substrate layer 1 together by heat lamination. Examples of materials that can be used as the heat sealing layer 9 include a heat sealing agent. Examples of heat sealing agents that can be used include a resin in which an acrylic-based resin and a vinyl chloride-acetate resin are mixed in a mass ratio of 60:40 to 70:30. The inclusion of 60 to 70% of an acrylic-based resin enables adhesion with the pattern layer 2 to be improved when the pattern layer 2 is made of an acrylic ink. Furthermore, the inclusion of 30 to 40% of a vinyl chloride-acetate resin enables the adhesion with the substrate layer 1 to be improved when the substrate layer 1 is made of an ABS resin. Examples of acrylic-based resins that can be used include "Acrynal LS #3002" manufactured by Toei Kasei Co., Ltd. Moreover, examples of vinyl chloride-acetate resins that can be used include "V424 PVC primer" manufactured by Toyo Ink Co., Ltd.

Also, the basis weight of the heat sealing layer 9 is 30% or more and less than 150% relative to the basis weight of the pattern layer 2. If it is less than 30%, air becomes trapped at the interface between the laminate 11 and the substrate layer 1, which causes the appearance of the decorative sheet for an automobile interior 30 to deteriorate. If it is greater than 150%, foaming of the solvent occurs inside the heat sealing layer 9, which causes the appearance of the decorative sheet for an automobile interior 30 to deteriorate. Specifically, from the viewpoint of the adhesion between the laminate 11 and the substrate layer 1, the basis weight of the heat sealing layer 9 is most preferably 30% or more and less than 100% relative to the basis weight of the pattern layer 2. If it is greater than 100%, although the appearance of the decorative sheet for an automobile interior 30 does not deteriorate, foaming of the solvent occurs inside the heat sealing layer 9, and the adhesion between the laminate 11 and the substrate layer 1 decreases.

Pattern Layer

The pattern layer 2 is a layer that provides the decorative sheet for an automobile interior 30 with a design property by means of a pattern. The pattern layer 2 is formed by using a printing ink, in which a colorant such as a dye or a pigment is dissolved or dispersed in a suitable diluent solvent together with a suitable binder resin. The printing ink is applied by various printing methods such as gravure printing or offset printing. Furthermore, examples of binder resins that can be used include urethane-based resins, acrylic-based resins, vinyl chloride-acetate resins, polyimide-based resins, nitrified cotton, or a mixture of these.

Specifically, when the transparent film layer 10 is an acrylic film, it is preferable to use an acrylic ink using an acrylic-based resin as the binder resin. Furthermore, examples of patterns include a wood grain pattern, a stone pattern, a cloth pattern, an abstract pattern, a geometric pattern, letters, symbols, a plain color, or a combination of these. Moreover, in order to improve the concealment of the decorative sheet for an automobile interior 30, an opaque printing ink or a coating material containing a large amount of an opaque pigment such as titanium dioxide or iron oxide may be provided as a concealing layer between the pattern layer 2 and the heat sealing layer 9.

Transparent Film Layer

The transparent film layer 10 is a protective layer for covering a third front surface 3a of the pattern layer 2. Furthermore, it provides a film-like layer that serves as a base of the laminate 11 when the decorative sheet for an automobile interior 30 is manufactured. Examples of materials that can be used for the transparent film layer 10 include thermoplastic resins. Examples of thermoplastic resins that can be used include polycarbonate, polymethylmethacrylate, polypropylene, and their mixtures, copolymers, composites, and laminates.

The transparency of the transparent film layer 10 is preferably sufficient to enable the pattern of the pattern layer 2 to be seen through the film. It is, for example, colorless and transparent, colored and transparent, or semi-transparent.

Surface Protection Layer

The surface protection layer 4 is a layer that is provided as necessary to protect the surface of the decorative sheet for an automobile interior 30. Examples of materials that can be used for the surface protection layer 4 include acrylic-based resins, fluororesins, and silicon-based resins. Examples of the acrylic-based resin that can be used include poly(meth) acrylonitrile, polymethyl(meth)acrylate, polyethyl(meth) acrylate, polybutyl(meth)acrylate, and polyacrylamide. Examples of fluororesin that can be used include polyvinylidene fluoride, tetrafluoroethylene resins, tetrafluoroethylene-perfluoroalkoxy vinyl ether copolymer, tetrafluoroethylene-hexafluoropropylene copolymer, polychlorotrifluoroethylene, tetrafluoroethylene-ethylene copolymer, chlorotrifluoroethylene-ethylene copolymer, and polyvinyl fluoride (PVF).

3.3. Method of Manufacturing Decorative Sheet for Automobile Interior

Next, the method of manufacturing the decorative sheet for an automobile interior 30 according to the third embodiment will be described.

First, the pattern layer 2 is formed by coating acrylic ink on one surface of the transparent film layer 10. The pattern of the pattern layer 2 is printed by back printing. Then, a heat sealing agent is applied to the rear surface 2b of the pattern layer 2, and the applied heat sealing agent is dried to form the heat sealing layer 9. At this time, the basis weight of the heat sealing layer 9 is 30% or more and less than 150% relative to the basis weight of the pattern layer 2. Specifically, it is preferable to adjust the basis weight of the heat sealing layer 9 to 30% such that the solvent contained in the heat sealing layer 9 is reduced to the minimum required amount, and volatile organic substances discharged from the heat sealing layer 9 are reduced. Thus, a laminate 11 is formed in which the heat sealing layer 9, the pattern layer 2, and the transparent film layer 10 are laminated in this order.

Next, the substrate layer 1 is attached to the rear surface 11b of the laminate 11, that is, the surface on the heat sealing layer 9 side, by heat lamination. Thus, the decorative sheet for an automobile interior 30 is manufactured.

As described above, in the decorative sheet for an automobile interior 30 according to the third embodiment, the basis weight of the heat sealing layer 9 relative to the basis weight of the pattern layer 2 is 30% or more and less than 150%. Therefore, the adhesion between the pattern layer 2 and the substrate layer 1 can be improved, and air entrapment which occurs as a result of air becoming trapped at the interface between the pattern layer 2 and the substrate layer 1 during heat lamination at low temperature can be suppressed. As a result, a decorative sheet for an automobile interior 30 can be provided which is capable of suppressing deterioration in the appearance due to air entrapment. Furthermore, because air entrapment can be suppressed, it is possible to perform heat lamination at low temperature.

Moreover, emission regulations for volatile organic compounds (VOCs) have been implemented in recent years as a result of a revision of the Air Pollution Control Law, and it is necessary to reduce the amount of emitted volatile organic compounds. Meanwhile, in the decorative sheet for an automobile interior 30 according to the third embodiment, the solvent content can be reduced by forming a sheet from a coating material such as an acrylic ink, which contains a large amount of volatile organic compounds. Furthermore, the formation of a sheet enables reproducibility of the design and diverse patterns.

Specifically, in the decorative sheet for an automobile interior 30 according to the third embodiment, the basis weight of the heat sealing layer 9 relative to the basis weight of the pattern layer 2 is 30% or more and less than 100%. Such a basis weight enables the adhesion between the pattern layer 2 and the substrate layer 1 to be further improved, and air entrapment which causes air to become trapped at the interface between the pattern layer 2 and the substrate layer 1 can be more reliably suppressed.

Furthermore, in the decorative sheet for an automobile interior 30 according to the third embodiment, when the substrate layer 1 contains an ABS resin, and the pattern layer 2 contains an acrylic ink, it is preferable for the heat sealing agent that constitutes the heat sealing layer 9 to be a resin in which an acrylic-based resin and a vinyl chloride-acetate resin are mixed at a mass ratio of 60:40 to 70:30. As a result, the adhesion between the substrate layer 1 and the heat sealing layer 9, and the adhesion between the pattern layer 2 and the heat sealing layer 9 can both be improved.

3-4. EXAMPLES

Hereinafter, Examples and Comparative Examples of the decorative sheet for an automobile interior 30 according to the third embodiment will be described. Note that the present invention is not limited to the Examples described below.

Example 1

First, a transparent film layer 10 was prepared as shown in FIG. 4. A polymethylmethacrylate film primary sheet (acrylic film primary sheet) was used as the transparent film layer 10. Then, a pattern layer 2 made of acrylic ink was formed by gravure printing on one surface of the transparent film layer 10. The amount of acrylic ink applied was 3 g/m$^2$ in the dried state.

Then, the rear surface 2b of the pattern layer 2 was coated with a heat sealing agent using a barcoder. A resin in which acrynal (LS #3002) and a PVC primer (acrylic-based, vinyl chloride-acetate based, V424) were mixed at a mass ratio of 68:32 was used as the heat sealing agent. The applied heat sealing agent was dried for 30 seconds in a room temperature environment at 40° C. to form the heat sealing layer 9. The amount of heat sealing agent applied was 1 g/m$^2$ in the dried state. That is, the basis weight of the heat sealing layer 9 was adjusted to be 33% relative to the basis weight of the pattern layer 2.

This formed a laminate 11, in which the heat sealing layer 9, the pattern layer 2, and the transparent film layer 10 were laminated in this order. Next, the substrate layer 1 was attached to the rear surface 11b of the laminate 11 by heat lamination using a 140° C. pouch processing machine. The processing speed was 2 m/min.

Thus, the decorative sheet for an automobile interior 30 of Example 1 was manufactured.

Example 2

In Example 2, the coating amount of the heat sealing agent of the heat sealing layer 9 was 3 g/m$^2$ in the dried state. That is, the basis weight of the heat sealing layer 9 was adjusted to be 100% relative to the basis weight of the pattern layer 2. Otherwise, the decorative sheet for an automobile interior 30 was prepared using the same conditions as in Example 1.

Example 3

In Example 3, the coating amount of the heat sealing agent of the heat sealing layer 9 was 2.8 g/m$^2$ in the dried state. That is, the basis weight of the heat sealing layer 9 was adjusted to be 98% relative to the basis weight of the pattern layer 2. Otherwise, the decorative sheet for an automobile interior 30 was prepared using the same conditions as in Example 1.

Example 4

In Example 4, the coating amount of the heat sealing agent of the heat sealing layer 9 was 4.4 g/m$^2$ in the dried state. That is, the basis weight of the heat sealing layer 9 was adjusted to be 148% relative to the basis weight of the pattern layer 2. Otherwise, the decorative sheet for an automobile interior 30 was prepared using the same conditions as in Example 1.

Example 5

In Example 5, a resin in which acrynal and a PVC primer were mixed at a mass ratio of 58:42 was used as the heat sealing agent of the heat sealing layer 9. Otherwise, the decorative sheet for an automobile interior 30 was prepared using the same conditions as in Example 1.

Example 6

In Example 6, a resin in which acrynal and a PVC primer were mixed at a mass ratio of 72:28 was used as the heat sealing agent of the heat sealing layer 9. Otherwise, the decorative sheet for an automobile interior 30 was prepared using the same conditions as in Example 1.

Comparative Example 1

In Comparative Example 1, the heat sealing layer 9 was omitted. That is, the basis weight of the heat sealing layer 9 was adjusted to be 0% relative to the basis weight of the pattern layer 2. Otherwise, the decorative sheet for an automobile interior 30 was prepared using the same conditions as in Example 1.

Comparative Example 2

In Comparative Example 2, the heat sealing agent of the heat seal coating amount of the heat sealing layer 9 was 6 g/m². That is, the basis weight of the heat sealing layer 9 was adjusted to be 200% relative to the basis weight of the pattern layer 2. Otherwise, the decorative sheet for an automobile interior 30 was prepared using the same conditions as in Example 1.

Comparative Example 3

In Comparative Example 3, the heat sealing agent of the heat seal coating amount of the heat sealing layer 9 was 10 g/m². That is, the basis weight of the heat sealing layer 9 was adjusted to be 333% relative to the basis weight of the pattern layer 2. Otherwise, the decorative sheet for an automobile interior 30 was prepared using the same conditions as in Example 1.

Comparative Example 4

In Comparative Example 4, the heat sealing agent of the heat seal coating amount of the heat sealing layer 9 was 0.8 g/m². That is, the basis weight of the heat sealing layer 9 was adjusted to be 28% relative to the basis weight of the pattern layer 2. Otherwise, the decorative sheet for an automobile interior 30 was prepared using the same conditions as in Example 1.

Comparative Example 5

In Comparative Example 5, the heat sealing agent of the heat seal coating amount of the heat sealing layer 9 was 4.6 g/m². That is, the basis weight of the heat sealing layer 9 was adjusted to be 152% relative to the basis weight of the pattern layer 2. Otherwise, the decorative sheet for an automobile interior 30 was prepared using the same conditions as in Example 1.

Performance Evaluation

The performance evaluation described below was performed on the decorative sheets for an automobile interior 30 of Examples 1 to 6 and Comparative Examples 1 to 5.

Solvent Amount Evaluation

In the solvent amount evaluation, gas chromatography ("GC-2010" manufactured by Shimadzu Corp.) was used to analyze the amount of solvent volatilized from 0.1 m² of the decorative sheet for an automobile interior 30. In terms of the evaluation criteria, a solvent amount of less than 1.6 mg was classified as a pass (excellent), a solvent amount of 1.6 mg or more and less than 3.0 mg was classified as a pass (good), and a solvent amount of 3.0 or more was classified as a fail (poor).

Appearance Evaluation

In the appearance evaluation, a laser microscope ("J5664" manufactured by Olympus Corp.) was used to observe the interface between the laminate 11 and the substrate layer 1, and the heat sealing layer 9. In terms of the evaluation criteria, cases where no air entrapment occurred at the interface and no foaming of the solvent occurred within the heat sealing layer 9 were classified as a pass (good), and cases where air entrapment or foaming of the solvent occurred were classified as a fail (poor).

Laminate Strength Evaluation

In the laminate strength evaluation, the laminate 11 of the decorative sheet for an automobile interior 30 was pulled by hand, and the occurrence of peeling, that is, interfacial peeling or cohesive peeling, was evaluated. In terms of the evaluation criteria, cases where neither interfacial peeling or cohesive peeling occurred were classified as a pass (good), cases where interfacial peeling or cohesive peeling have not occurred but are showing signs of these were classified as a pass (fair), and cases where interfacial peeling or cohesive peeling occurred were classified as a fail (poor).

Evaluation Results

The evaluation results are shown in Table 3 below.

TABLE 3

|  | Basis weight of heat sealing layer [%] | Mass ratio between Acrynal and PVC primer | Solvent test amount [m/g] | Appearance evaluation | Laminate strength evaluation | Overall evaluation |
|---|---|---|---|---|---|---|
| Example 1 | 33 | 68:32 | Excellent (1.216) | Good | Good | Excellent |
| Example 2 | 100 | 68:32 | Good (1.633) | Good | Good | Good |
| Example 3 | 98 | 68:32 | Excellent (1.550) | Good | Good | Excellent |
| Example 4 | 148 | 68:32 | Good (2.410) | Good | Good | Good |
| Example 5 | 33 | 58:42 | Good (2.660) | Good | Fair | Fair |
| Example 6 | 33 | 72:28 | Excellent (1.216) | Good | Fair | Fair |
| Comparative Example 1 | 0 | 68:32 | Excellent (0.310) | Poor | Poor | Poor |
| Comparative Example 2 | 200 | 68:32 | Poor (3.159) | Poor | Good | Poor |
| Comparative Example 3 | 333 | 68:32 | Poor (5.116) | Poor | Good | Poor |
| Comparative Example 4 | 28 | 68:32 | Excellent (1.216) | Poor | Good | Poor |
| Comparative Example 5 | 152 | 68:32 | Excellent (1.633) | Poor | Good | Poor |

As shown in Table 3, in the decorative sheets for an automobile interior 30 of Examples 1 to 6, because the basis weight of the heat sealing agent was low, the evaluation result of the solvent amount evaluation was a pass (excellent) or (good). Specifically, the evaluation results of Examples 1, 3, and 6 were (excellent). Furthermore, in the decorative sheets for an automobile interior 30 of Examples 1 to 3, the evaluation results of the appearance evaluation and the laminate strength evaluation was respectively pass (good). Moreover, in the decorative sheets for an automobile interior 30 of Examples 5 and 6, the evaluation result of the appearance evaluation was a pass (good), and the laminate strength evaluation was a pass (excellent). Therefore, the overall evaluation resulting from the solvent amount evaluation, the appearance evaluation, and the laminate strength evaluation was a pass (excellent), (good), or (fair).

On the other hand, because the decorative sheet for an automobile interior 30 of Comparative Example 1 does not have a heat sealing layer 9, air entrapment occurred at the interface between the pattern layer 2 and the substrate layer 1, and the appearance evaluation was a fail (poor). Furthermore, the adhesion strength between the pattern layer 2 and the substrate layer 1 was low, and the laminate strength evaluation was a fail (poor). In addition, in the decorative sheets for an automobile interior 30 of Comparative Examples 2, 3, and 5, because the basis weight of the heat sealing agent was relatively high, the evaluation result of the solvent amount was high. Moreover, because the solvent amount is high, foaming of the solvent occurred inside the heat sealing layer 9, and the appearance evaluation was a fail (poor). Also, in the decorative sheet for an automobile interior 30 of Comparative Example 4, air entrapment occurred at the interface between the laminate 11 and the substrate layer 1, and the appearance evaluation was a fail (poor). Therefore, in Comparative Examples 1 to 5, the overall evaluation resulting from the solvent amount evaluation, the appearance evaluation, and the laminate strength evaluation was a fail (poor).

Therefore, it was confirmed that, compared to the decorative sheets for an automobile interior 30 of Comparative Examples 1 to 5, the decorative sheets for an automobile interior 30 of Examples 1 to 6 were superior in terms of the solvent amount, appearance, and peeling resistance.

Reference Signs List 1: Substrate layer, 1a: First Front Surface, 2: Pattern layer, 2a: Second Front Surface, 3: Thermoplastic resin layer, 3a: Third Front Surface, 4: Surface protection layer, 4a: Fourth Front Surface, 5: Adhesive layer, 6: Uneven pattern, 7, 8: Point of intersection, 9: Heat sealing layer, 9a: Ninth Front Surface, 10: Transparent film layer, 10a: Tenth Front Surface, 11: Laminate, 11b: Rear surface, 20: Decorative sheet, 30: Decorative sheet for an automobile interior.

What is claimed is:

1. A decorative sheet for an automobile interior, comprising:
    a substrate layer;
    a heat sealing layer that is provided on a side of a front surface of the substrate layer;
    a pattern layer that is provided on a side of a front surface of the heat sealing layer;
    a transparent film layer that is provided on a side of a front surface of the pattern layer;
    a surface protection layer that is provided on a side of a front surface of the transparent film layer; wherein
    a basis weight of the heat sealing layer is 33% or more and 98% or less relative to a basis weight of the pattern layer, wherein the heat sealing layer consists of a resin in which an acrylic-based resin and a vinyl chloride-acetate resin are mixed at a mass ratio of 60:40 to 70:30 and wherein the surface protection layer consists of a single resin selected from acrylic-based resins, fluororesins, and silicon-based resins; wherein the pattern layer is made of an acrylic ink, wherein the acrylic ink comprises an acrylic-based resin, which is a single binder resin of the acrylic ink, and wherein the transparent film layer consists of a thermoplastic resin selected from polycarbonate, polymethylmethacrylate and polypropylene, wherein an amount of a solvent volatilized from 0.1 $m^2$ of the decorative sheet is less than 1.6 mg, wherein no air is entrapped at an interface between the substrate layer and the heat sealing layer and wherein an amount of the acrylic ink in the pattern layer in a dried state is 3 $g/m^2$.

2. The decorative sheet for an automobile interior of claim 1, which is a laminate.

3. The decorative sheet for an automobile interior of claim 2, wherein the laminate consists of the substrate layer;
    the heat sealing layer;
    the pattern layer;
    the transparent film layer; and the surface protection layer.

4. The decorative sheet for an automobile interior of claim 1, wherein a total thickness of the decorative sheet is 255 μm or more and 550 μm or less, and, a thickness ratio of the transparent film layer to the substrate layer is 1:1.5 to 1:7.

5. The decorative sheet for an automobile interior of claim 1, wherein
    a total thickness of the decorative sheet is 275 μm or more and 550 μm or less, and,
    a thickness ratio of the transparent film layer to the substrate layer is 1:2.5 to 1:6.

6. The decorative sheet for an automobile interior of claim 1, wherein the heat sealing layer consists of a resin in which an acrylic-based resin and a vinyl chloride-acetate resin are mixed at a mass ratio of 68:32.

7. The decorative sheet for an automobile interior of claim 1, wherein the transparent film layer consists of polymethylmethacrylate.

8. The decorative sheet for an automobile interior of claim 6, wherein the transparent film layer consists of polymethylmethacrylate.

9. The decorative sheet for an automobile interior of claim 1, wherein the single resin of the surface protection layer is an acrylic-based resin.

10. The decorative sheet for an automobile interior of claim 1, wherein the single resin of the surface protection layer is selected from poly(meth)acrylonitrile, polymethyl(meth)acrylate, polyethyl(meth)acrylate, polybutyl(meth)acrylate, and polyacrylamide.

11. The decorative sheet for an automobile interior of claim 1, wherein the single resin of the surface protection layer is a fluororesin.

12. The decorative sheet for an automobile interior of claim 1, wherein the single resin of the surface protection layer is selected from polyvinylidene fluoride, tetrafluoroethylene resins, tetrafluoroethylene-perfluoroalkoxy vinyl ether copolymer, tetrafluoroethylene-hexafluoropropylene copolymer, polychlorotrifluoroethylene, tetrafluoroethylene-ethylene copolymer, chlorotrifluoroethylene-ethylene copolymer, and polyvinyl fluoride.

13. The decorative sheet for an automobile interior of claim 1, wherein the single resin of the surface protection layer is a silicon-based resin.

\* \* \* \* \*